US008838352B2

(12) United States Patent
Eriksson et al.

(10) Patent No.: US 8,838,352 B2
(45) Date of Patent: Sep. 16, 2014

(54) METHOD AND DEVICE FOR SELECTING A STARTING GEAR IN A VEHICLE

(75) Inventors: Anders Eriksson, Torslanda (SE);
Johan Bjernetun, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 536 days.

(21) Appl. No.: 13/058,208

(22) PCT Filed: Aug. 28, 2008

(86) PCT No.: PCT/SE2008/000482
§ 371 (c)(1),
(2), (4) Date: Feb. 9, 2011

(87) PCT Pub. No.: WO2010/024732
PCT Pub. Date: Mar. 4, 2010

(65) Prior Publication Data
US 2011/0144871 A1 Jun. 16, 2011

(51) Int. Cl.
*B60W 10/10* (2012.01)
*F16H 61/02* (2006.01)
*F16H 59/18* (2006.01)
*B60W 20/00* (2006.01)

(52) U.S. Cl.
CPC ............ *F16H 61/0213* (2013.01); *F16H 59/18* (2013.01); *F16H 2061/023* (2013.01); *B60W 20/30* (2013.01); *Y10S 477/90* (2013.01)
USPC ................... 701/65; 701/67; 701/66; 701/68; 192/3.51; 192/3.61; 477/70; 477/900

(58) Field of Classification Search
None
See application file for complete search history.

(56) References Cited

U.S. PATENT DOCUMENTS

| 4,495,457 A | * | 1/1985 | Stahl ................................. 701/62 |
| 4,525,782 A | * | 6/1985 | Wohlfarth et al. ............... 701/99 |
| 4,561,530 A | * | 12/1985 | Parsons et al. ................ 477/176 |
| 4,679,145 A | * | 7/1987 | Beeck et al. .................... 701/51 |

(Continued)

FOREIGN PATENT DOCUMENTS

| EP | 1138985 A2 | 10/2001 |
| JP | 03272360 A | 12/1991 |
| JP | 2006132562 A | 5/2006 |
| WO | 0242108 A1 | 5/2002 |

OTHER PUBLICATIONS

International Search Report for corresponding International Application PCT/SE2008/000482.

*Primary Examiner* — Thomas Tarcza
*Assistant Examiner* — Richard Goldman
(74) *Attorney, Agent, or Firm* — WRB-IP LLP

(57) ABSTRACT

A method and a vehicle transmission for selecting a starting gear in a vehicle are provided, the method including steps of measuring a starting gear selection parameter, and selecting a starting gear for the next coming vehicle take-off in dependence of the measured starting gear selection parameter, wherein the starting gear selection parameter is the number of vehicle take offs per time unit. Additionally the parameter can be acceleration in movement of an accelerator pedal being depressed by a driver, accelerator pedal position and clutch wear. Benefits are increased clutch endurance for a vehicle that during at least a period has to perform frequent take-offs and at the same time enhancing take-off comfort for a vehicle that during at least a period goes long-distance.

12 Claims, 3 Drawing Sheets

(56) References Cited

U.S. PATENT DOCUMENTS

| | | | |
|---|---|---|---|
| 5,176,234 A * | 1/1993 | Reik et al. | 192/53.2 |
| 5,406,862 A * | 4/1995 | Amsallen | 74/336 R |
| 5,454,768 A * | 10/1995 | Jones et al. | 477/83 |
| 5,626,534 A * | 5/1997 | Ashley et al. | 477/79 |
| 6,040,768 A * | 3/2000 | Drexl | 340/453 |
| 6,386,351 B1 * | 5/2002 | Salecker et al. | 192/54.1 |
| 6,394,931 B1 * | 5/2002 | Genise | 477/97 |
| 6,412,361 B1 * | 7/2002 | Wolf et al. | 74/336 R |
| 6,953,410 B2 * | 10/2005 | Wheeler et al. | 475/115 |
| 7,181,328 B2 * | 2/2007 | Berglund et al. | 701/53 |
| 7,421,326 B2 * | 9/2008 | Thor et al. | 701/67 |
| 8,401,750 B2 * | 3/2013 | Karlsson | 701/58 |
| 2005/0080525 A1 * | 4/2005 | Hoeflacher et al. | 701/29 |
| 2005/0211528 A1 * | 9/2005 | Hou | 192/85 R |
| 2006/0079377 A1 * | 4/2006 | Steen et al. | 477/186 |
| 2006/0200295 A1 * | 9/2006 | Berglund et al. | 701/51 |
| 2007/0294017 A1 * | 12/2007 | Joshi et al. | 701/67 |
| 2008/0228340 A1 * | 9/2008 | Rains et al. | 701/29 |
| 2010/0108461 A1 * | 5/2010 | Bitzer | 192/30 W |
| 2011/0010060 A1 * | 1/2011 | Karlsson | 701/54 |
| 2011/0144871 A1 * | 6/2011 | Eriksson et al. | 701/51 |

* cited by examiner

METHOD AND DEVICE FOR SELECTING A STARTING GEAR IN A VEHICLE

BACKGROUND AND SUMMARY

The present invention relates to method and device for selecting a starting gear in a vehicle.

The present invention also relates to a computer program, a computer program product and a storage medium, such as a computer memory, all to be used with a computer for executing said method.

The selection of a starting gear in a heavy vehicle can be selected in dependence of vehicle weight and road inclination. The criteria is that the vehicle have a good ability to take off and that heat energy released when, for example lamellas in a friction clutch arranged between a propulsion unit and a gearbox is slipping during the take off, has to be limited. A great amount of released heat energy in the clutch during a take off results in a high clutch temperature and increased clutch wear.

WO0242108 and U.S. Pat. No. 6,412,361 disclose examples of arrangements for starting gear selection.

When different take-offs sometimes occur relatively close to each other in time, for example when driving in a queue, then a too high starting gear tends to be selected. There is a risk that the clutch will be overheated. On the other hand an even higher starting gear could have been selected when few vehicle take-offs occur, for example in long-distance traveling, where there is relatively long between the take-offs.

The state of the art solution is usually a compromise between the long-distance traffic condition and the queue driving condition.

A technical problem addressed by an aspect of the present invention is therefore to provide a starting gear selection with increased adaptability. Moreover, the present invention seeks, according to an aspect thereof, to provide such a starting gear selection that is better suited, for example, to the requirements of heavy commercial vehicles.

It is desirable to provide a starting gear selection with improved adaptability which is capable of enhancing clutch endurance for a vehicle that has to, at least at times, perform frequent take-offs and at the same time enhancing the ability for take off for a vehicle that during at least a period goes long-distance.

According to a first aspect of the invention, a method comprises the steps of:
 measuring at least one starting gear selection parameter;
 selecting a starting gear for the next coming vehicle take-off in dependence of said measured starting gear selection parameter. The method is characterized in that said starting gear selection parameter is the number of vehicle take offs per time unit.

In one embodiment of the method according to an aspect of the invention said starting gear selection parameter can be two parameters, where the first is said number of starts per time unit and the second parameter is one of:
 acceleration in movement of an accelerator pedal being depressed by a driver of the vehicle during at least one preceding vehicle take-off,
 accelerator pedal position of said accelerator pedal during at least one preceding vehicle take-off and/or,
 measured wear of a clutch arranged for torque transmission between a propulsion unit and a gearbox in said vehicle.

In one embodiment of the method according to an aspect of the invention said starting gear selection parameter can be three parameters, where the first parameter is said number of starts per time unit and the second and third parameter is two of said:
 acceleration in movement of an accelerator pedal being depressed by a driver of the vehicle during at least one preceding vehicle take-off,
 accelerator pedal position of said accelerator pedal during at least one preceding vehicle take-off and/or,
 measured wear of a clutch arranged for torque transmission between a propulsion unit and a gearbox in said vehicle.

In one embodiment of the method according to the invention said starting gear selection parameter can be all said four parameters.

In a further embodiment of the method according to an aspect of the invention the driver manually selects and engages said starting gear for the next coming vehicle take-off after being advised by a starting gear selection advisor, which advises in dependence of said one or two starting gear selection parameters.

In another embodiment of the method according to an aspect of the invention said starting gear for the next coming vehicle take-off is automatically selected and engaged in dependence of said one or two starting gear selection parameters.

According to an aspect of the invention, there is provided a vehicle transmission comprising a clutch, a gearbox and a control unit with sensors arranged for measuring at least one starting gear selection parameter, and where a propulsion unit is drivingly connected to driven wheels of a vehicle via said clutch and said gearbox, characterized in that said control unit is arranged to performed the steps of the method noted above.

BRIEF DESCRIPTION OF THE DRAWINGS

The present invention will be described in greater detail below with reference to the accompanying drawings which, for the purpose of exemplification, show further preferred embodiments of the invention and also the technical background, and in which.

DETAILED DESCRIPTION

Figure 1:
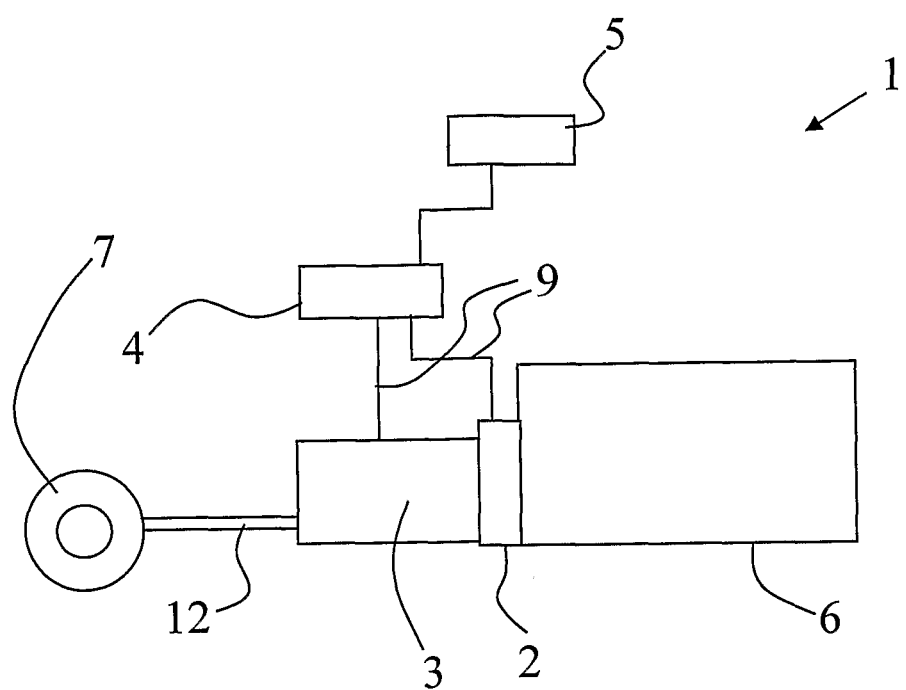
FIG. 1 shows an example of a vehicle power-train which is suitable for the use of the different embodiments of the invention, which will be further explained below.

In one embodiment of the invention a vehicle 1 is equipped with a propulsion unit 6, for example a diesel engine, which is drivingly coupled to a clutch 2, which can for example be a single-disk dry plate clutch. The clutch is further coupled to driven wheels 7 via a gearbox 3 and a propeller shaft 12. If said gearbox is partly or fully automated a control unit 4 can be arranged to control functions of said gearbox 3 and said clutch 4 in a known manner. In such embodiment the lines 9 indicates communication lines between the control unit and the gearbox and between the control unit and the clutch.

One or several different sensors 5 are arranged for measuring one or several different starting gear selection parameters. The control unit 4 is fed with information about a starting gear selection parameter. The sensor 5 can be a sensor for measuring only the number of vehicle take-offs per time unit. In an alternative embodiment of the invention the sensor 5 can be several sensors where one sensor is arranged to measure the number of vehicle take-offs per time unit and the other one or more sensors can be arranged to measure at least one of the following starting gear selection parameters:

acceleration in movement of an accelerator pedal (not shown) being depressed by a driver of the vehicle 1 during at least one preceding vehicle take-off and/or;

accelerator pedal position of said accelerator pedal during at least one preceding vehicle take-off and/or;

wear of said clutch 2 arranged for torque transmission between a propulsion unit 6 and a gearbox 3 in said vehicle 1.

Said control unit is, according to one embodiment of the invention, programmed to:

measure one or several of the above mentioned starting gear selection parameters and then;

select a starting gear for the next coming vehicle take-off in dependence of said measured starting gear selection parameter.

For example said control unit can according to the invention be programmed to measure the number of vehicle take offs per time unit during a predetermined time interval. If said vehicle take-offs occur more than, for example, five times per minute then the selection of starting gear for the next take off will be amended by the control unit. The next starting gear will be selected for example one gear step lower compared to a normal selection of starting gear, i.e. a starting gear that is only determined in dependence of vehicle mass and road inclination. The benefit is that the endurance of the clutch will not be decreased due to frequent take-offs being close to each other in time. In one embodiment of the invention the control unit can be programmed to consider more than one predetermined value of the amount of vehicle take-offs per time unit. For example if the control unit 4 would register more than 10 take-offs per minute then the control unit can be programmed to lower a subsequent starting gear two gear steps compared to a normal selection of starting gear. Such a further differentiation would further increase the endurance of the clutch.

In a corresponding way according to one embodiment of the invention when the control unit 4 registers for example that there has been less than one vehicle take-off during a half an hour then said control unit can be programmed to increase a coming starting gear one gear step compared to normal selection of starting gear. Thus, take-off comfort will increase without jeopardizing clutch endurance.

In another embodiment of the invention said control unit can be programmed to consider at least one further starting gear selection parameter besides for example the mentioned number of vehicle take-offs per time unit. The further starting gear selection parameter can be one of or several of mentioned acceleration in movement of an accelerator pedal or accelerator pedal position of said accelerator pedal or wear of said clutch 2. When an increased number of gear selection parameters are considered a more adapted starting gear selection will be achieved and the clutch endurance will be secured even more.

In one embodiment of the invention, if said control unit registers, through a sensor 5 adapted for measuring acceleration in movement of an accelerator pedal, that said acceleration has been above a predetermined value during the last, for example, ten take-offs then said control unit can be programmed to lower a coming starting gear one gear step compared to normal selection of starting gear. Relating to the above mentioned example if, at the same time, less than one vehicle take off during a half an hour has been registered then the control unit can be programmed to select starting gear according to normal starting gear selection since the two mentioned registered starting gear selection parameters evens each other out.

In the corresponding way different combinations of two or several of the above mentioned starting gear selection parameters can be matched against each other.

According to another embodiment of the invention if the control unit registers a more gentle handling of the accelerator pedal, i.e. an acceleration less than a predetermined value is registered then, of course, the control unit can be programmed to lower a coming starting gear one gear step compared to normal selection of starting gear.

According to another embodiment of the invention if the control unit registers that the clutch has been worn more than a predetermined amount of millimeters during the last, for example, 100 take-offs then the control unit can be programmed to permanently lower all coming selected starting gears one gear step compared to normal selection of starting gear until the clutch has been restored during for example the next service stop. This is beneficial if for example the mass of the vehicle has been wrongly estimated during earlier take-offs so that a to high starting gear has been selected frequently.

According to a further embodiment of the invention if the control unit registers that the accelerator pedal during some preceding take-offs has been depressed only slightly during several seconds making the vehicle move slowly (like during marshalling), the control unit can be programmed to lower selected starting gear one gear step compared to normal selection of starting gear. If the driver during the next coming take-offs clearly depresses said accelerator pedal more than, for example 30%, then the control unit can be programmed to select starting gear according to normal starting gear selection, which means that the starting gear will be increased one gear step.

Figure 2:
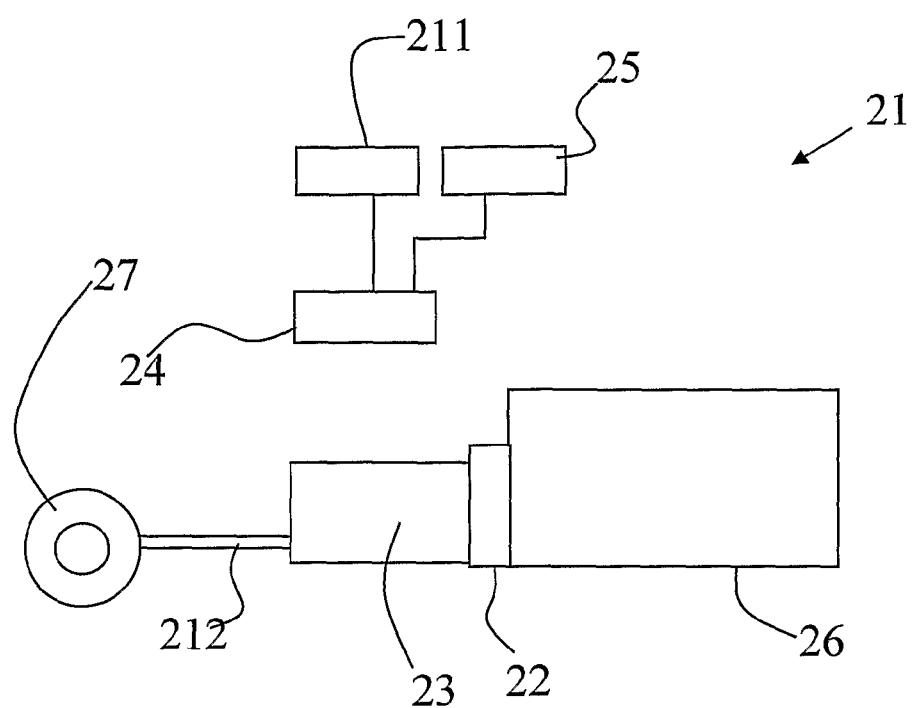
FIG. 2 shows another example of a vehicle power-train which is suitable for the use of other different embodiments of the invention, which will be further explained below.

In another embodiment disclosed in FIG. 2 said gearbox can be manually controlled by the driver through for example a gearshift lever (not shown) according to known art. Thus, in such an embodiment of the invention the communication lines 9 are missing. This exemplified embodiment comprises a vehicle 21 equipped with a propulsion unit 26, for example a diesel engine, which is drivingly coupled to a clutch 22, which can for example be a single-disk dry plate clutch. The clutch is further coupled to driven wheels 27 via a gearbox 23 and a propeller shaft 212. A control unit 24 can be arranged to receive information from several different sensors 25 arranged for measuring one or several different starting gear selection parameters. Said starting gear selection parameters being as described above. This embodiment of the invention mainly differs from the embodiments described through FIG. 1 in that said control unit 24 sends information about which starting gear to select to a starting gear selection advisor 211, which is arranged to advise the driver which starting gear to select. The control unit 24 determines a starting gear for the coming take-off in a similar way as the control unit 4, but sends the information to a starting gear selection advisor 211 instead of to a gearbox and clutch. Said starting gear selection advisor 211 can for example be a display or a voice information system in the cab of the vehicle 21.

Thus, the main principals of the invention can be used for both a power-train with an automated transmission and a manual transmission. In alternative embodiments it would also be possible to use the above described embodiments of the invention in for example automated manual transmissions (AMT) or double clutch transmissions (DCT). In further alternative embodiments it would also be possible to use the above described embodiments of the invention in for example a Parallel Hybrid Electrical Vehicle (PHEV).

Figure 3:
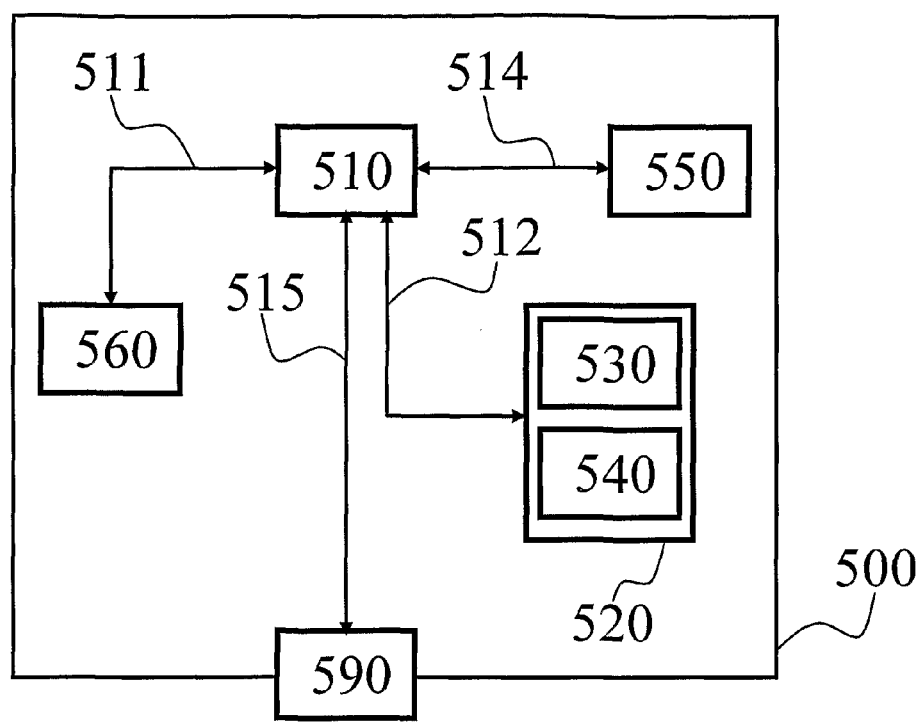
FIG. 3 shows the invention applied on a computer arrangement.

FIG. 3 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the control unit 4 or 24. The data-processing unit 510 can comprise, for example, a microcomputer.

The memory 520 also has a second memory part 540, in which a program for selecting a starting gear in a vehicle according to the invention is stored. In an alternative embodiment, the program for selecting a starting gear in a vehicle is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. A method for selecting a starting gear in a vehicle, the method comprising:
    selecting a normal starting gear as a function of vehicle mass; and
    after selecting a normal starting gear
        measuring at least one starting gear selection parameter, and
        selecting, via a control unit, a next starting gear for the next coming vehicle take-off in dependence of the measured starting gear selection parameter, the starting gear selection parameter being the number of vehicle take-offs per time unit, the next starting gear being a gear lower than the normal starting gear if the number of vehicle take-offs per unit time exceeds a predetermined number.

2. The method as in claim 1, wherein the starting gear selection parameter is two parameters where the first is the number of starts per time unit and the second parameter is one of:
    acceleration in movement of an accelerator pedal being depressed by a driver of the vehicle during at least one preceding vehicle take-off,
    accelerator pedal position of the accelerator pedal during at least one preceding vehicle take-off and,
    measured wear of a clutch arranged for torque transmission between a propulsion unit and a gearbox in the vehicle.

3. The method as in claim 2, wherein the starting gear selection parameter is three parameters, where the first parameter is the number of starts per time unit and the second and third parameter is two of the:
    acceleration in movement of an accelerator pedal being depressed by a driver of the vehicle during at least one preceding vehicle take-off,
    accelerator pedal position of the accelerator pedal during at least one preceding vehicle take-off and,
    measured wear of a clutch arranged for torque transmission between a propulsion unit and a gearbox in the vehicle.

4. The method as in claim 3, wherein the starting gear selection parameter is all the four parameters.

5. The method as in claim 2, wherein the driver manually selects and engages the starting gear for the next coming, vehicle take off after being advised by a starting, gear selection advisor, which advises in dependence of the one or two starting gear selection parameters.

6. The method as in claim 2, wherein the starting gear for the next coming vehicle take off is automatically selected and engaged in dependence of the one or two starting gear selection parameters.

7. The method as in claim 1, wherein the next starting gear is two gears lower than the normal starting gear if the number of vehicle take-offs per unit time exceeds a second predetermined number that is greater than the first predetermined number.

8. The method as in claim 1, wherein the next starting gear is one gear higher than the normal starting gear if the number of vehicle take-offs per unit time is less than a second predetermined number that is less than the first predetermined number.

9. A vehicle transmission comprising a clutch, a gearbox and a control unit with sensors arranged for measuring at least one starting gear selection parameter, and where a propulsion unit is drivingly connected to driven wheels of a vehicle via the clutch and the gearbox, wherein the control unit is arranged to perform the steps of claim 1.

10. A computer comprising program code for performing all the steps of claim 1.

11. A computer program product comprising program code stored on a non-transitory computer readable medium for performing all steps of claim 1 when the program product is run on a computer.

12. A non-transitory storage medium for use in a computing environment, comprising a computer readable program code to perform the method of claim 1.

* * * * *